United States Patent
Albrecht et al.

(10) Patent No.: US 7,433,848 B1
(45) Date of Patent: Oct. 7, 2008

(54) SYSTEM FOR CARRYING OUT A TRANSACTION

(75) Inventors: Norbert Albrecht, Berlin (DE); Walter Hinz, Garching (DE); Hermann Weilacher, Ampermoching (DE)

(73) Assignee: Giesecke & Devrient GmbH, Munich (DE)

( * ) Notice: Subject to any disclaimer, the term of this patent is extended or adjusted under 35 U.S.C. 154(b) by 634 days.

(21) Appl. No.: 10/030,078

(22) PCT Filed: Jul. 11, 2000

(86) PCT No.: PCT/EP00/06577

§ 371 (c)(1),
(2), (4) Date: Jun. 21, 2002

(87) PCT Pub. No.: WO01/04771

PCT Pub. Date: Jan. 18, 2001

(30) Foreign Application Priority Data

Jul. 12, 1999 (DE) .................................. 199 32 149

(51) Int. Cl.
*H04K 1/00* (2006.01)
*H04L 9/00* (2006.01)

(52) U.S. Cl. .................... 705/73; 705/77; 705/64; 705/65; 705/55; 705/51; 705/16; 705/17; 705/21

(58) Field of Classification Search .................. 705/64, 705/1
See application file for complete search history.

(56) References Cited

U.S. PATENT DOCUMENTS

| | | | | |
|---|---|---|---|---|
| 5,715,399 A | * | 2/1998 | Bezos | 705/27 |
| 5,809,141 A | * | 9/1998 | Dent et al. | 380/247 |
| 5,815,577 A | * | 9/1998 | Clark | 380/52 |
| 5,878,141 A | * | 3/1999 | Daly et al. | 705/78 |
| 6,205,579 B1 | * | 3/2001 | Southgate | 717/173 |
| 2002/0077992 A1 | * | 6/2002 | Tobin | 705/65 |

FOREIGN PATENT DOCUMENTS

| | | |
|---|---|---|
| EP | 0305004 | 3/1989 |
| EP | 0397908 | 11/1990 |
| EP | 0666681 | 8/1995 |
| EP | 0753811 | 1/1997 |

OTHER PUBLICATIONS

Applied Cryptography, Bruce Schneier, John Wiley & Sons Inc, pp. 223-225.*
Durocher, Joseph. "Possessing a POS" Restaurant Business; Jul. 1, 1995, vol. 94 Issue 10, p. 142, 2 p.*
Cannon, G.L., Wandyke, W.R., Stricklin, D.M.: "Downloadable Pager Functionality," Motorola Technical Developments, Motorola Inc., Schaumburg, Illinois, Mar. 18, 1993.

* cited by examiner

*Primary Examiner*—Andrew J. Fischer
*Assistant Examiner*—Joshua Murdough
(74) *Attorney, Agent, or Firm*—Bacon & Thomas, PLLC

(57) ABSTRACT

A system is proposed for performing transactions with terminals which fundamentally allow a plurality of different transactions to be performed. The terminals (10, 11) are connected for this purpose via a terminal network (30) with at least one node computer (40, 41) via which they can be set up for performing a transaction. The suitability for performing a further, hitherto unprepared transaction can be provided later anytime without any special setup measures. A terminal (10, 11) requests for this purpose data providing the functionality required for performing the further transaction from a node computer (40, 41) following a trigger signal designating the further transaction. The transaction is then performed in interaction between a terminal (10, 11) and a node computer (40, 41).

12 Claims, 7 Drawing Sheets

SYSTEM FOR CARRYING OUT A TRANSACTION

This invention starts out from a system according to the preamble of the main claim.

Such a system is known from EP-B-0 305 004. The system for performing financial transactions described here provides terminals on the user side a plurality of which are connected in parallel arrangement with a so-called concentrator. The concentrators are in turn connected in parallel arrangement via a bank network with a background bank system. The connections between the system parts are protected independently of each other against spying out of the traffic passing therethrough. The connections between terminals and concentrators are protected using security boxes preferably designed in the form of smart cards on the terminal side. The decisive element of the system structure is the concentrators performing the communication with the background system and having all means required therefor. The terminals connected with a concentrator are only capable of communication with the respective preceding concentrator. The structure of the terminals can thus be kept simple.

A difficulty with multisubscriber systems like the aforementioned is the setup of new system features or the change of existing ones. The involved problems become evident in particular when a system change to be made, e.g. the introduction of a new software security feature, relates to at least two system subscribers and the latter are technically not identical. System adaptation must then normally be performed individually for each type of subscriber. If the functionality of a terminal cannot be changed later, the terminal must be completely replaced.

DE-A1-38 15 071 in addition discloses adapting a communication terminal in the form of a teletex terminal or television receiver to a given use situation on site by reloading program packages. The device has a microprocessor unit, a storage device, an interface to an external program source and a plurality of assemblies to be controlled by the microprocessor unit. Activation and control of the assemblies are effected with the aid of application program packages which are transmitted to the storage device from the external program source before the first use of the device. The proposed concept allows the production of technically uniform devices which are adjusted to the adjusted to the place of use on site by loading corresponding application program packages.

The concept described in DE-A-38 15 071 offers the greatest benefit when the communication devices are prepared at the factory for performing all the functions that are at all possible and have all the assemblies necessary therefor as well as an accordingly large storage device. Communication devices of this type can be produced comparatively reasonably by mass production but are oversized for many applications. Everyday use of the devices furthermore presupposes that the particular device has been prepared for performing the desired function upon setup by loading a corresponding application program package. In other words, only functionalities previously set up in a separate setup step can be used. Each new functionality or change of an existing one must be set up in a separate operating step.

The invention is based on the problem of providing a flexible transaction system with very simply constructed terminals which simplifies the introduction of new system features or the change of existing ones.

This problem is solved by a system having the features of the main claim. The problem is in addition solved by a terminal according to independent claim 9 and a method according to independent claim 10.

The inventive system is characterized by the fact that the functionality of a terminal is not permanently defined by its technical design or setup but is variable and only determined by software which it receives from a preceding node computer. As far as the technical design of the terminals is concerned there is only the specification that they be able to accept software supplied by the node computers and execute it. Within the limits of this specification the terminals can be designed freely and in particular independently of their later functionality. Terminals can advantageously be of technically uniform design for very different transactions. Transferring essential parts of the possible functionalities to the node computers permits simple design of the terminals. This advantageously also permits the terminal-node computer interface to be defined independently of the functionality of the terminal, thus independently of the type of terminal and thus uniformly for all types of terminal. The free designability of the terminal within fixed limits in connection with uniform design of the terminal-node computer interfaces substantially facilitates the setup of new system software features and/or the change of existing ones. An especially favorable embodiment provides that system changes take effect on the terminals virtually without delay. Since its functionality is fundamentally configurable freely anytime, each terminal can be used for performing several different transactions. Terminal functionalities can also be newly set up anytime and the development of software for new functionalities is substantially facilitated since no interfaces, network or terminal peculiarities need be heeded. In addition, servicing and maintenance routines are considerably facilitated.

The proposed transaction system is suitable for, among other things, use in bank or payment transaction applications, issuing electronic tickets or for health insurance cards.

An inventive terminal according to independent claim 9 is characterized in that it permits the structure of a transaction system according to the main claim.

The inventive method according to independent claim 10 has the advantage that its carrying out leads to a system according to the main claim.

Further expedient embodiments and advantageous developments of the system according to the main claim, of the terminal according to independent claim 9 and of the method according to independent claim 10 can be found in the respective dependent claims.

An example of the invention will be explained in more detail in the following with reference to the drawing, in which.

Figure 1:
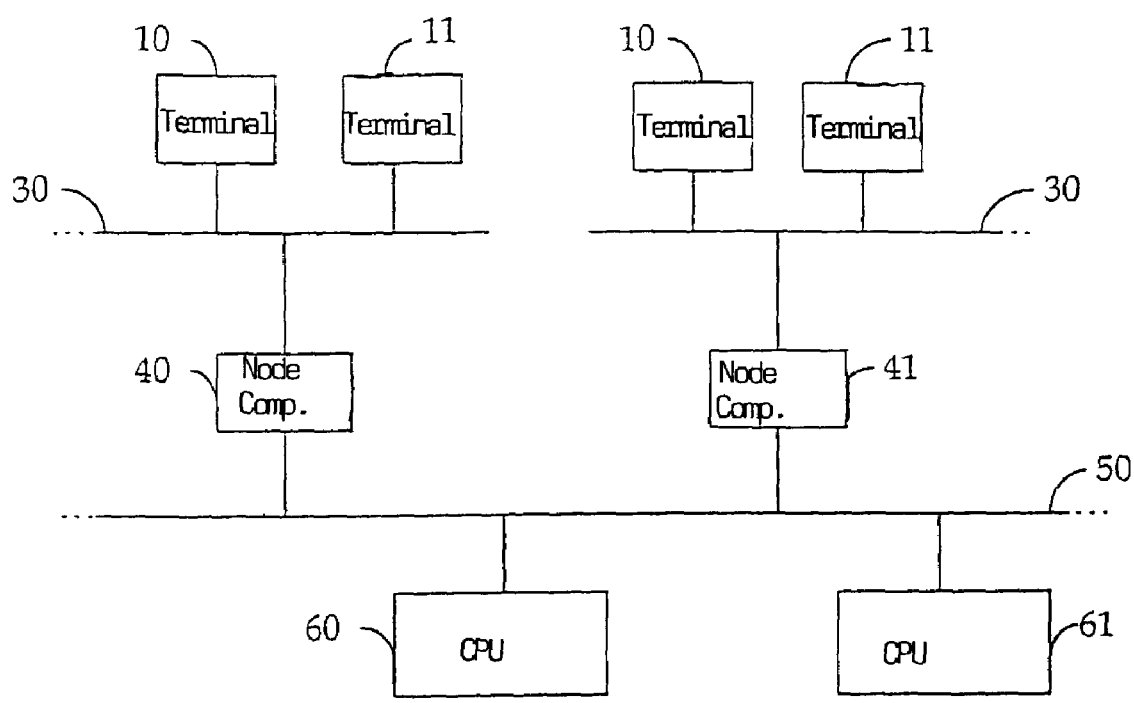
FIG. 1 shows the structure of a transaction system.

FIG. 1 shows terminal 11 for performing a transaction which is connected with node computer 40 via terminal network 30. Node computer 40 is in turn connected with central processing unit 50 via background network 60. Terminal network 30 can have connected thereto in parallel with terminal 11 further terminals 10 which have the same basic structure as terminal 11 but need not be identically designed. Background network 50 can have connected thereto in parallel with node computer 41 further node computers 40 each of which is again the starting point for terminal network 30 to which one or more terminals 10 are connected. Background network 50 can furthermore have connected thereto in parallel with central processing unit 60 further central processing units 61. Terminal network 30 and background network 50 can be designed completely or partly as fixed or wireless networks; in particular terminal network 30 can be realized via the Internet. The connection of terminals 10, 11, node computers 40, 41 and also central processing units 60, 61 to respective networks 30, 50 can accordingly also be of wirebound and/or contactless type.

The network structure shown in FIG. 1 permits a plurality of different transactions to be performed, including payment functions in the form of direct debiting or a purse, credit card functions, charge card functions, applications of a terminal user, health insurance functions, servicing and maintenance functions or diagnostic functions.

Figure 2:
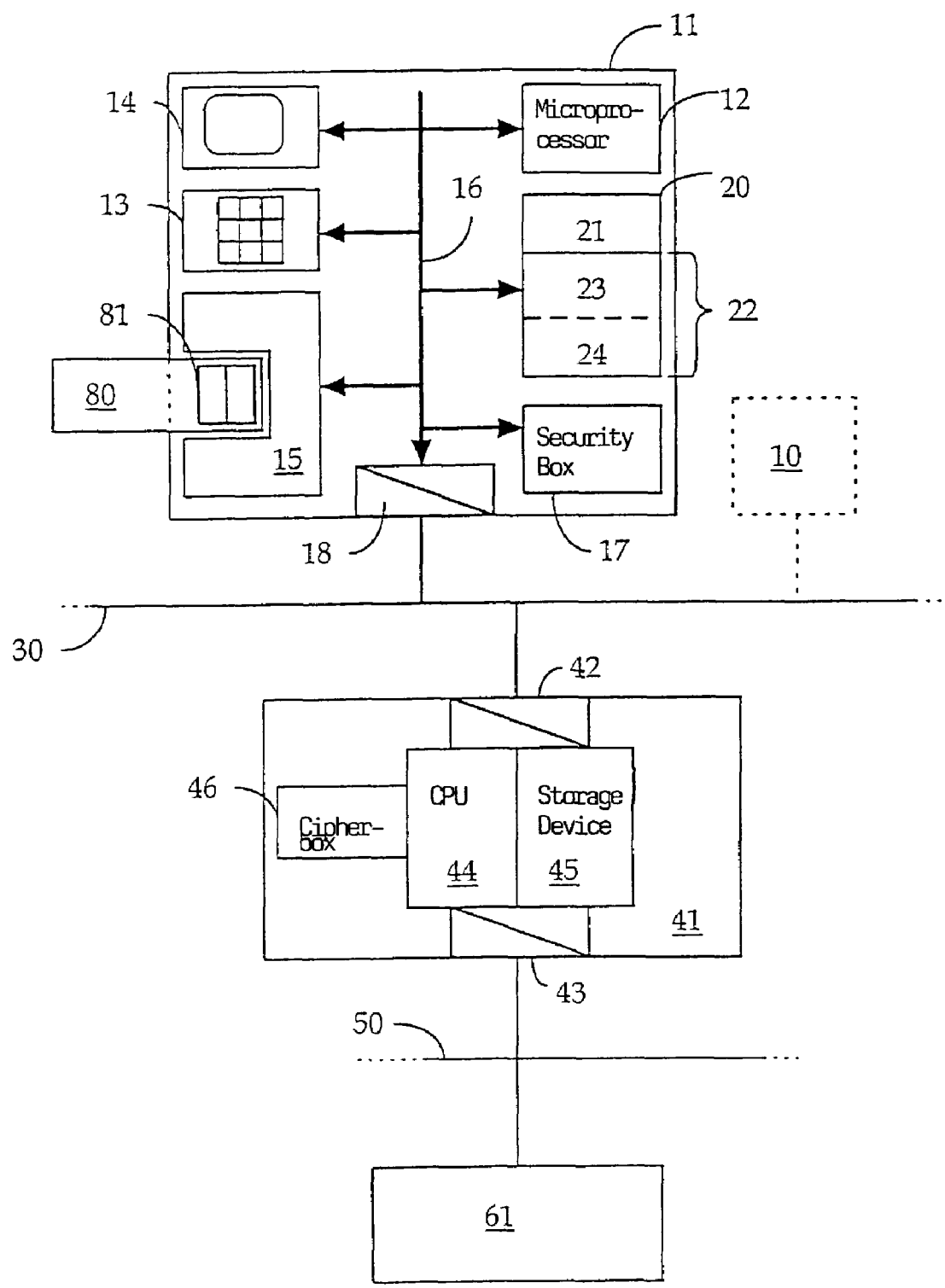
FIG. 2 shows a detail of the structure shown in FIG. 1.
Figure 3:
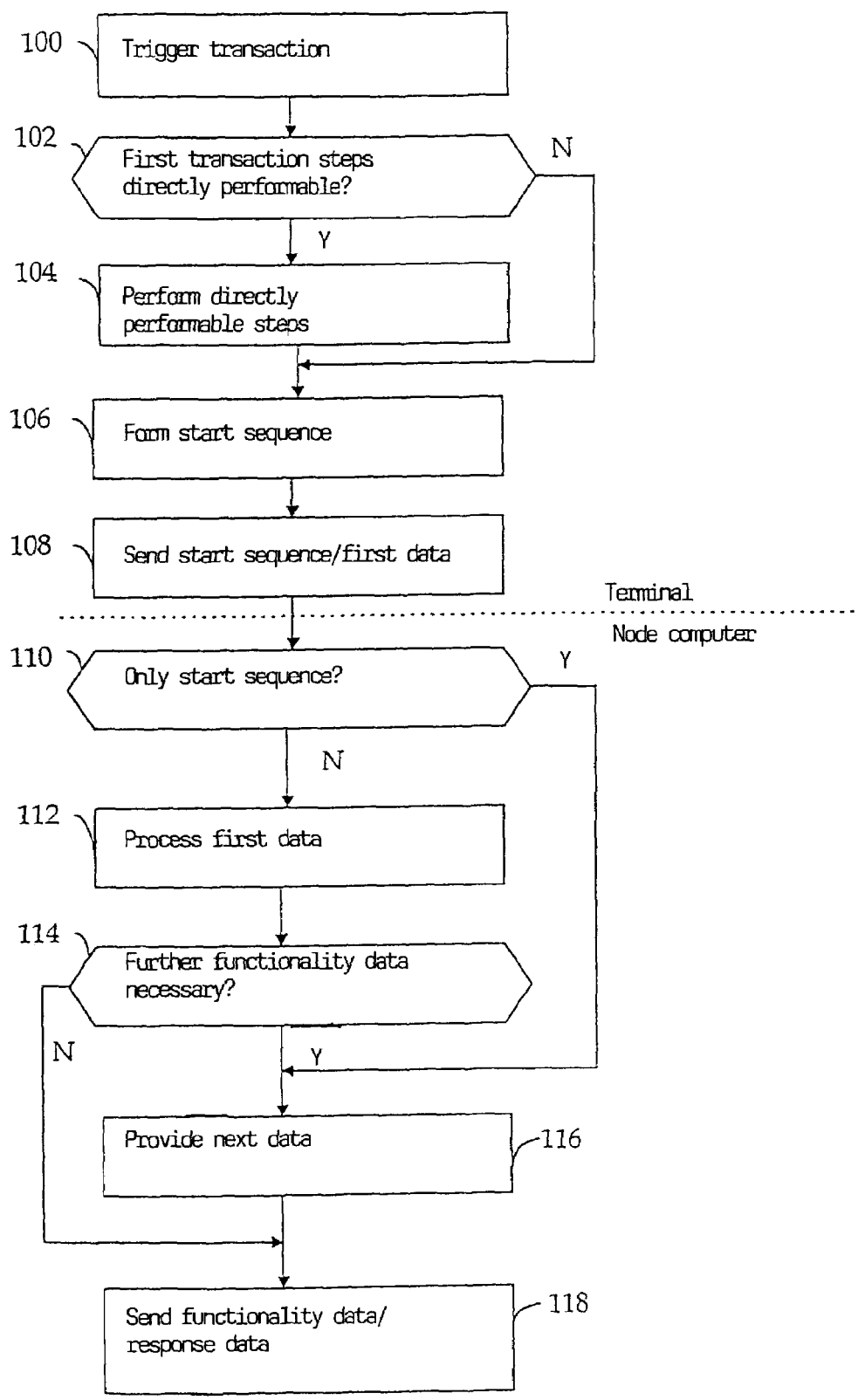
FIG. 3 shows a flow chart to illustrate the operation of a transaction system.

FIG. 2 shows more elaborately a detail of the network structure illustrated in FIG. 1 having terminal 11, node computer 41 and central processing unit 61. A main element of terminal 11 is microprocessor 12 connected via intradevice bus 16 with storage device 20, operating apparatus 13, picture display unit 14, user data interface 15, contact-type or contactless interface 16 to terminal network 30, and security box 17. Storage device 20 is divided as known in the art into volatile section 21, usually in the form of a RAM, which serves in particular as a working memory for processor 12, and nonvolatile section 22, which is again divided into read-only area 23, usually in the form of a ROM, and read-write area 24, usually in the form of an EEPROM. Read-only area 23 contains in particular initial operating program data which are imperative for providing basic operativeness of terminal 11 and must not be changed later, in particular a bootstrap for loading program packages for defining the terminal functionality. Read-write area 24 preferably contains all data which provide the functionality of the terminal in connection with initial operating program data in read-only area 23.

Operating apparatus 13 enables a user to trigger and/or continue a transaction. It thus has actuating means by which the user can generate control signals to be supplied to processor 12 via bus 16. Input of control signals is supported by display on picture display unit 14. In a common embodiment the operating apparatus is designed as a keypad which can be integrated expediently into picture display unit 14 in the form of soft keys. To increase system security, operating apparatus 13 can have means for identifying a user, e.g. means that evaluate biometric data such as a fingerprint recognizer.

User data interface 15 is preferably designed as a read/write unit for communication with portable data carrier 80 which forms part of terminal 11 for the following description. Data carrier 80 bears microcomputer 81 which in turn has a microprocessor and a memory, whereby the latter may fundamentally be constructed like storage device 20. Communication between user data interface 15 and microcomputer 81 can be of contact or contactless type. Portable data carrier 80 is expediently designed as a smart card or magnetic stripe card but can also have any other form of appearance, e.g. the form of a watch.

Security box 17 supports system security and contains information for encrypting and decrypting information outputted via interface 16 to terminal network 30 and incoming from there, in order to prevent unauthorized persons from spying out the traffic through terminal network 30.

Portable data carrier 80 contains information required for performing a transaction with the aid of terminal 11. Such information may be for example an account number for performing a banking transaction, a value memory content for performing a payment operation, the name of an insurance for preparing a medical treatment billing, or a sum memory content for recording bonus information. Microcomputer 81 of portable data carrier 80 can in addition contain data for providing a terminal functionality. Furthermore it can contain operationally necessary elements of terminal-side processor 12, terminal-side storage device 20 or security box 17, so that operation of terminal 11 is possible only together with portable data carrier 80. If they are designed as elements of data carrier 80, processor 12, storage device 20 and/or security box 17 can accordingly be completely or partly omitted on the terminal side. Other terminal components 13, 14 can also accordingly be realized partly or completely on data carrier 80; their selection and type of distribution can fundamentally be designed freely from the point of view of expediency.

Node computer or computers 40, 41 form servers for terminals 10, 11, performing the transactions triggered via connected terminals 10, 11 in interaction with terminals 10, 11 and making connections between terminals 10, 11 and central processing units 60, 61 via background network 50. For performing these functions, node computers 40, 41 are equipped with accordingly efficient processor units 44 and large storage devices 45. Processor unit 44 is connected with terminal network 30 via contactless or contact-type first interface 42, and with background network 50 via contactless or contact-type second interface 43. For protecting both the traffic to terminals 10, 11 and the traffic to background network 50, node computer 41 has cipherbox 46. It manages and processes information for encrypting and decrypting the data exchange effected with particular terminal 10, 11 or central processing unit 60, 61. Encryption and decryption are based on mechanisms known in the art.

An important function of node computer 41 is to provide the terminal functionality required for performing a transaction after triggering of the transaction on terminal 10, 11. Storage device 45 therefore normally contains a plurality of data for providing functionalities possible on connected terminals 10, 11.

Central processing units 60, 61 typically have the form of usual computing centers as found at network operators, banks, credit card institutions, loading centers, authorization centers, service centers and the like. Since central processing units 60, 61 are well known in this sense and they are used only in their known functions for the inventive system, their structure will not be dealt with in any detail here.

A characteristic property of the transaction system shown in FIG. 1 is that the particular functionality of terminals 10, 11 is not firmly associated therewith but defined by software which they receive from node computers 41. This definition may be permanent or vary depending on the situation. Essential parts of a functionality can advantageously be transferred to node computers 40, 41. FIG. 2 illustrates this property with reference to the sequence of steps in performing a transaction.

A user first triggers a transaction via operating apparatus 13, step 100. Following the trigger signal, terminal processor 12 checks whether the data for providing the functionality required for the intended transaction are available in storage device 20. If that is the case, processor 12 directly performs the first transaction steps possible with the available data, step 102. For example, for a transaction to be performed by means of smart card 80, processor 12 causes user data interface 15 (then designed as a reading unit) to read the card data out of the memory of card microcomputer 81 and asks the user to input further control signals via operating apparatus 13, e.g. user identification information. Furthermore, processor 12 generates a start sequence, step 106, which states the transaction that was triggered and contains that information identifying particular terminal 10, 11.

If the check in step 102 yields that the data for providing a functionality required for performing a transaction are not present in storage device 20, processor 12 only forms the start sequence. The start sequence and, if available, the data present due to first performed transaction steps, are encrypted by processor 12 with the aid of the protection information contained in security box 17 and sent via terminal network 30 to associated node computer 41.

Processor unit 44 thereof receives the data via interface 42 and decrypts them with the aid of the decryption information contained in cipherbox 46. Processor unit 44 thereupon checks the decrypted data for whether they consist only of a start sequence or already comprise the result data of first transaction steps, step 110. In the former case, processor unit 44 determines from the start sequence the terminal functionality required for performing the triggered transaction and checks whether the corresponding data are present in storage device 45 of node computer 41. If that is not the case, processor unit 44 requests them from central processing unit 60, 61 via background network 50. When the necessary data are present, processor unit 44 makes them available for transfer to terminal 11, step 116.

If the check in step 110 yields that the first data received from terminal 10, 11 already comprise results of first performed transaction steps, processor unit 44 processes them and generates first response data. It normally does so conducting a data exchange with central processing units 60, 61 via background network 50.

Subsequent to the processing of the first data, processor unit 44 checks whether terminal 11 is to be supplied further data for providing the required functionality for performing the next transaction steps, step 114. If this is the case, it continues performing step 116 and checks whether the required data are present in storage device 45. If it ascertains that required data are not present in storage device 45 it requests them from corresponding central processing unit 60, 61 via background network 50. The data, if The data, if they are required, and the first response data are thereupon sent by node computer 40, 41 to terminal 11 via terminal network 30.

If the response data sent back by node computer 41 are solely data for providing a functionality, i.e. the necessary data were not available in storage device 20 of terminal 11 upon triggering of the transaction, terminal processor 12 accepts the data in storage device 20. Then it causes the first transaction steps to be performed. It sends back the resulting first data to node computer 41 which thereupon performs step sequence 102 in sequence.

If the data sent back to terminal 11 by node computer 41 comprise more extensive response data, terminal processor 12 causes the next transaction steps to be performed. If further data for providing the functionality required for performing the transaction were transferred with the more extensive response data, it accepts them in storage device 20 and uses them directly for performing the next transaction steps.

The data for providing the functionality for performing the transaction can be retained in the storage device after the end of the transaction. When the transaction is next performed, terminal processor 12 then performs the first transaction steps after the triggering of a transaction directly without previously requesting the data for providing the required functionality from node computer 41. Terminal 11 can perform the transactions possible due to a functionality again anytime without any need to request data from node computer 40, 41.

It can be provided, on the other hand, that the data for providing the functionality for a transaction are deleted after the end of the transaction. Terminal processor 12 then newly loads the data necessary for providing the required functionality each time a transaction is performed. Storage device 20 can in this case consist only of volatile memory area 21 along with area 23 for storing the initial program data.

The transmission of data required for providing the functionality for a certain transaction need not necessarily be triggered by triggering the transaction itself. It can also be effected independently of the actual triggering of a certain transaction. The trigger can be any defined events. For example, it can be provided that the data for the most important or most frequently performed transactions are transmitted to a terminal when the terminal is first connected to a network. In a variant, data for the most important or most frequently performed transactions are loaded when any one of the most most important or most frequent transactions is triggered for the first time. A further possible trigger event is a servicing or maintenance measure performed on the terminals regularly or upon request. In all cases a data transmission, once triggered, can be used for regularly updating functionalities already set up in a terminal, whereby outdated versions are overwritten with current ones in the memory of the terminal.

Figure 4:
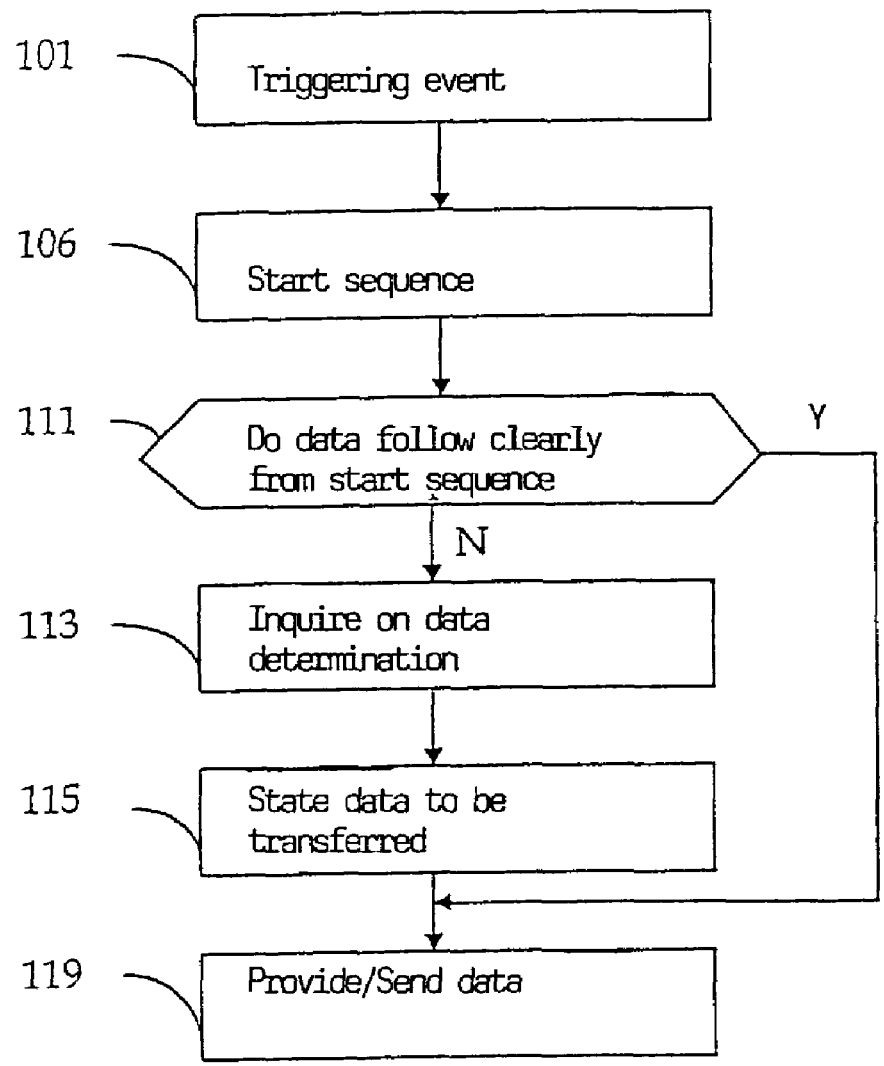
FIG. 4 shows a flow chart of an operating variant.

FIG. 4 illustrates a possible sequence of a data transmission, which is not directly bound to a transaction, from the node computer to the terminal.

The sequence is started by the occurrence of a predetermined event, step 101, e.g. a servicing time being reached.

Terminal 11 then forms a start sequence again, step 106, which states the transaction that was triggered and contains information identifying particular terminal 11 and sends it to the associated node computer.

Node computer 41 checks whether the start sequence defines data clearly to be transmitted directly, step 111.

If that is not the case, the node computer generates an inquiry to detect the data to be transmitted to the terminal and sends it to the terminal, step 113.

The terminal executes the inquiry and states the desired data to the node computer in a corresponding response, step 115.

Node computer 41 then checks whether the required data are present in storage device 45. If it ascertains that required data are not present in its storage device 45, it requests them from corresponding central processing unit 61 via background network 50. It thereupon sends the data to terminal 1 via terminal network 30, step 119.

If the information about the data to be transmitted follows directly from the start sequence upon its check in step 111, the node computer directly performs step 119.

It can further be provided that the terminals are already equipped with a selection of functionalities in the new state. The selection can expediently include the most important or most frequently used functionalities. If in particular the storage capacity permits, all possible functionalities can also be set up on a terminal.

Figure 5:
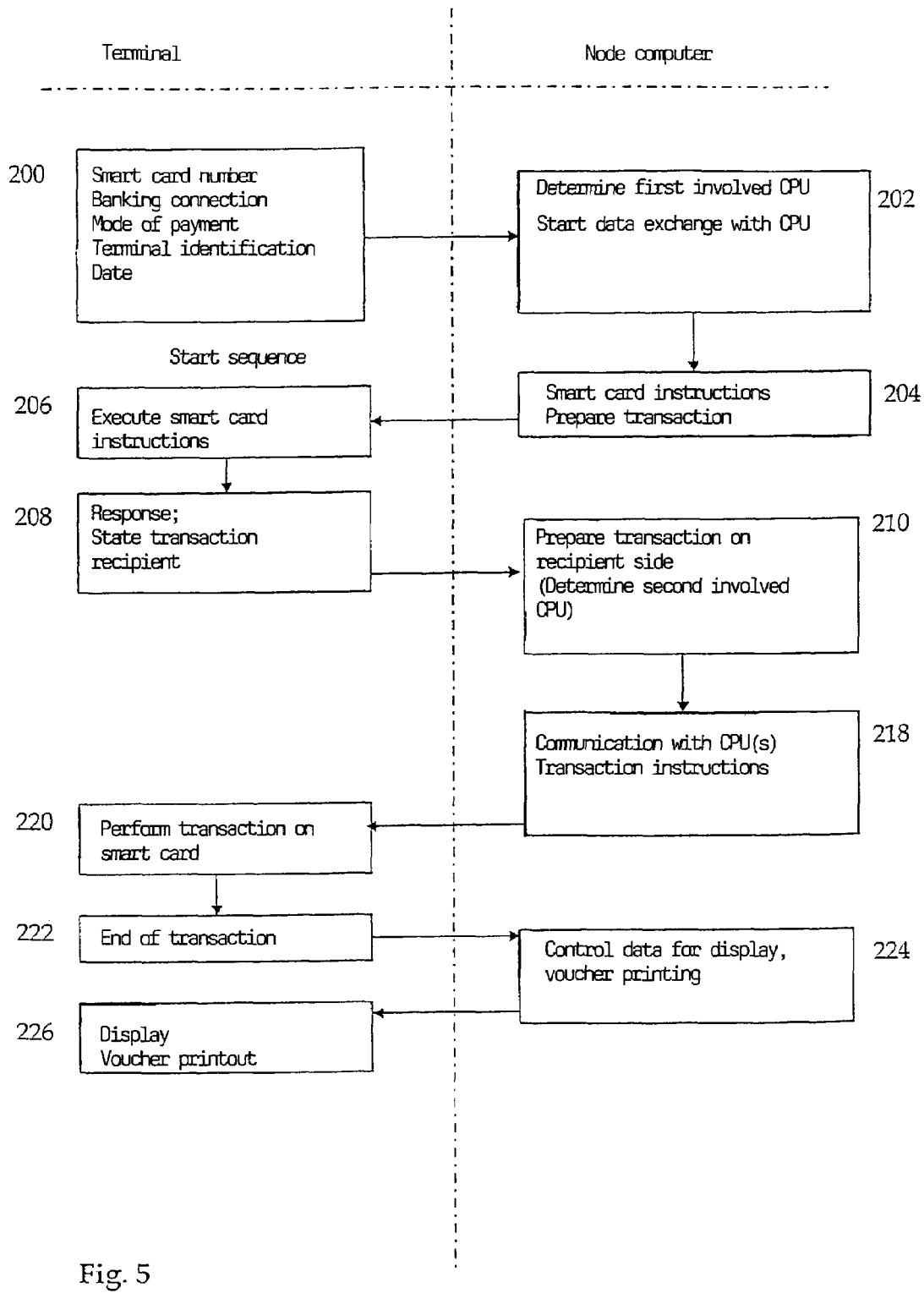
FIG. 5 shows an example of a data exchange between a terminal and a node computer.

FIG. 5 illustrates a possible data exchange between node computer 41 and terminal 11 used as a payment transaction terminal. For the shown data exchange, essential parts of the functionality are realized in node computer 41. Let it be assumed that the data for providing the functionality "payment transaction" are already present in in storage device 20 of terminal 11 and that the transactions performable by terminal 11 presuppose the use of smart card 80. The transaction is a payment operation involving book transfer of an amount of money from an account corresponding to smart card 80 at a first bank with central processing unit 61 to an account at a second bank with central processing unit 61. Terminal 11 is a terminal installed with a dealer, for which a virtual dealer card, i.e. a data carrier in the manner of a smart card realized in program form, is created in associated node computer 41.

The payment transaction is triggered by inserting smart card 80 into user data interface 15 designed as a reading device. When terminal 11 recognizes that a transaction is to be performed, the user's authorization to use card 80 is expediently first checked in known fashion, e.g. by checking a PIN. If said check is positive, terminal 11 reads general card data, e.g. a card number and/or banking connection, out of memory 83 of the smart card. If the card permits a plurality of different transactions, being e.g. operable alternatively as a purse or debit or credit card, terminal 11 asks the user by a display on picture display unit 14 to select a transaction, i.e. select a mode of payment. It then asks the user by a display on picture display unit 14 to input an amount to be transferred. Furthermore, terminal 11 provides data for terminal identification and date information. From general card data, amount, terminal information data and date information the terminal forms a start sequence, step 200, which it sends to node computer 41. The sending of the start sequence and the total following data exchange between terminal 11 and node computer 41 are effected in encrypted form, using encryption methods known in the art. A first key is expediently allocated to terminal 11, being formed within the framework of the start sequence or possibly in a pre-ceding step on the basis of the terminal identification. It serves in the following as an overlapping transport key for protecting the total data exchange between terminal 11 and node computer 41. A further key is expediently allocated to smart card 80, being used to form data protection codes in order to permit in particular a check of the intactness of data.

Node computer 41 determines central processing unit 61 corresponding to the banking connection designated in the start sequence where the account belonging to card 80 is created, step 202. It begins a data exchange with determined central processing unit 61. This involves for example first a check of whether the intended payment payment operation is permitted at all. If the intended transaction is thus fundamentally possible, node computer 41 transfers to terminal 11 data which set up terminal 11 for performing the intended transaction and in particular include instructions which cause user data interface 15 to access smart card 80 further, step 204. The data also contain instructions which cause terminal 11 to report who the recipient or giver of a payment is to be.

Terminal 11 executes the received data and smart card instructions, step 206. When smart card 80 is prepared for performing a debit, terminal 11 sends node computer 41 after encryption a response, step 208, which in this example contains information that a payment is to be made from the card to the virtual dealer card associated with the terminal.

Node computer 41 determines from the response who an amount to be debited or credited to card 80 or the associated account is to be credited or debited to, in the assumed example the virtual dealer card. With reference to the terminal information data sent in the start sequence, node computer 41 therefore reads the memory of the virtual dealer card and determines central processing unit 60 associated with the dealer card. It thereupon opens a data exchange with the latter, step 210, to set up the virtual dealer card for crediting.

When smart card 80 and dealer card are prepared, node computer 41 sends terminal 11 transaction instructions which cause the debit to be entered in the memory of smart card 80 on the terminal side, step 218. Parallel thereto it notes the corresponding credit in the memory of the virtual dealer card and causes the transaction to be performed between involved central processing units 60, 61 in a data exchange via background network 50.

Terminal 11 enters the debit on the smart card, step 220, and acknowledges the end of the transaction by returning an acknowledgement to node computer 41, step 222.

When the accounting part of the transaction is over, node computer 41 generates control data which cause terminal 11 to show a voucher display for the performed transaction, i.e. the performed accounting operation, on picture display unit 14, step 224. If terminal 11 has a voucher output associated therewith, e.g. in the form of a printer, node computer 41 expediently also generates control data for printing a voucher. It sends the control data to terminal 11 which executes them without further processing, step 226.

Figure 6:
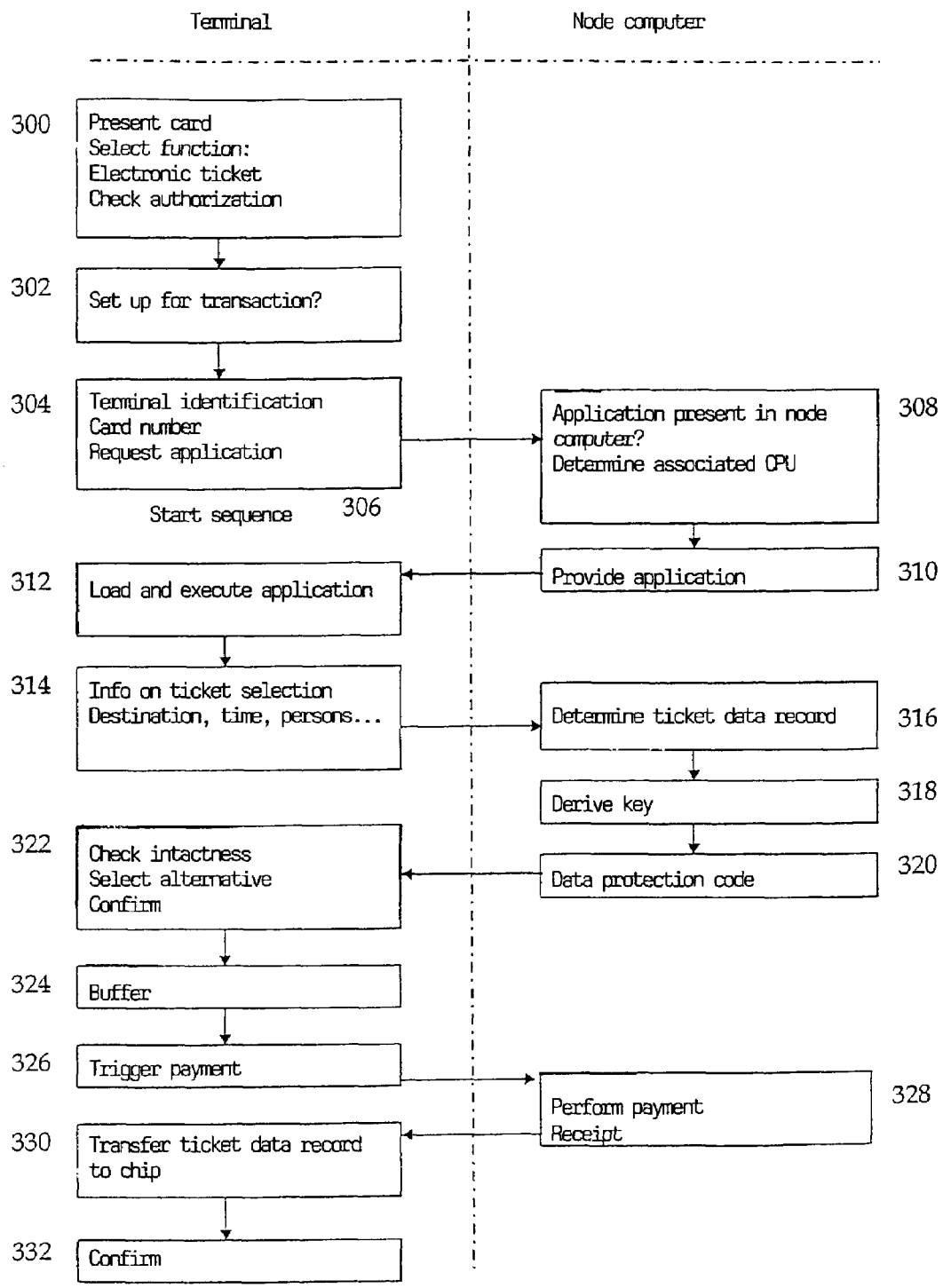
FIG. 6 shows a data exchange using a terminal for issuing an electronic ticket.

FIG. 6 illustrates as a further possible use of the transaction system shown in FIG. 2 a variant in which terminal 11 is used to issue electronic tickets. It is assumed that the electronic ticket has the form of a data record which is entered in the memory of smart card 80. Terminal 11 accordingly has user data interface 15 in the form of a smart card contacting unit.

A ticket issuing transaction is triggered by the customer presenting smart card 80 to terminal 11 and/or reporting e.g. via operating apparatus 13 that he wants to perform the transaction "electronic ticket," step 300, in order to acquire an electronic ticket. When terminal 11 then recognizes that a ticket issuing transaction is to be performed, a check of the customer's authorization to use smart card 80 for the intended transaction can first be provided, e.g. in known fashion by checking a PIN.

When it is certain that the transaction "electronic ticket" is to be performed and the customer is entitled to perform the transaction, terminal 11 determines the card number of smart card 80 and checks whether it is set up for further performing an "electronic ticket" transaction, step 302. If that is not the case, it further ascertains whether sufficient free memory space is available for setting up the functionality.

Subsequently terminal 11 generates start sequence 306 comprising the card number and a terminal identification. If the functionality required for performing the transaction "electronic ticket" is not present in storage device 20 of terminal 11, start sequence 306 furthermore comprises information indicating that terminal 11 requires the data for setting up the functionality, said data being referred to as application in the following.

Start sequence 306 is encrypted by means of an overlapping transport key associated with terminal 11 and generated using the terminal identification within the framework of the start sequence or in a preceding, separate data exchange by a usual method. The transport key protects the total subsequent data exchange between terminal 11 and node computer 41. Generation and use of the key are based in known fashion on the communication participants each knowing independently of each other a secret which cannot be exchanged between terminal 11 and node computer 41 via terminal network 30. The secret is, on the one hand, firmly stored in terminal 11, preferably in security box 17, and, on the other hand, managed in node computer 41 or via background network 50 by central processing units 60, 61. If a secret necessary for generating a key is not available in node computer 41, the latter procures it from managing central processing unit 60, 61.

Terminal 11 sends encrypted start sequence 306 to associated node computer 41. Processor unit 44 thereof checks after receiving—and decrypting—start sequence 306 whether the application "electronic ticket" is present in storage device 45 of node computer 41, step 308. If that is not the case, node computer 41 determines, e.g. with the aid of the terminal information, central processing unit 60, 61 which has the data realizing the application and requests the data therefrom via background network 50. When application data are ready, step 310, node computer 41 transfers them to terminal 11.

Processor 12 thereof accepts the application data in storage device 20 and executes the set up functionality, step 312. Terminal 11 asks the customer via picture display unit 14 to select a ticket. Selection is effected interactively in prompted fashion. Using operating apparatus 13 the customer provides, when requested by picture display unit 14, information necessary for determining the required ticket, e.g. starting point and destination, time of travel, number of persons, travel class, etc., step 314. When all information necessary for determining a ticket has been inputted into terminal 11, terminal 11 transfers the selection data to node computer 41.

From the information on ticket selection received from terminal 11 node computer 41 determines a data record representing the electronic ticket, step 316. Node computer 41 is expediently set up to perform simple and especially frequently requested ticket determinations, e.g. determination of a ticket for the local transport service, directly by processor unit 44 of node computer 41. In many cases, however, the determination of a ticket involves complex program runs which usually necessitate the intervention of central processing unit 60, 61 via background network 50. The resulting ticket data record might comprise, along with the information used for determination, possible ticket alternatives and in particular the fare or fares.

Node computer 41 thereupon generates from the card number as well as a secret also firmly stored in smart card 80 a smart card-specific key which is subsequently used for forming a data protection code, step 318.

When node computer 41 has generated a smart card-specific key, it uses it to form a data protection code, e.g. a MAC (message authentication code), for the resulting ticket data record, and encrypts the resulting ticket data block consisting of ticket data record and data protection code with the aid of the transport key, step 320. Node computer 41 transfers the resulting encrypted ticket data block to terminal 11.

Terminal 11 decrypts the incoming ticket data block with the aid of the transport key which it generates, e.g. in security box 17, in the same way as node computer 41. Terminal 11 performs a precheck of the intactness of the ticket data record by e.g. checking whether the decrypted ticket data record has certain values at defined positions. Terminal 11 passes the decrypted ticket data record on to smart card 80 which checks its intactness by checking the data protection code by means of the smart card-specific key present on smart card 80.

If the ticket data record proves to be intact, terminal 11 asks the customer by a corresponding display on picture display unit 14 to check the electronic ticket for correctness and confirm the purchase, step 322. If the ticket data record comprises several possible electronic ticket alternatives, terminal 11 asks the customer to make a selection among the offered alternatives. In simple cases without alternatives, for example the purchase of a ticket for a local transport service, no selection or confirmation of purchase by the customer is necessary.

When the electronic ticket sent to terminal 11 is accepted by the customer, the confirmed part of the ticket data record constituting the selected ticket is first buffered in storage device 20 of terminal 11, step 324. In addition, terminal 11 causes payment of the electronic ticket, step 326. The payment operation can be effected by cash payment or e.g. by collection of electronic money stored on smart card 80, as described in connection with FIG. 5.

When the payment operation is completed, node computer 41 generates an acknowledge signal, step 328, which it transfers to node computer 41.

After receiving the acknowledge signal, node computer 41 generates a control instruction which causes processor 12 of terminal 11 to transmit the ticket data record stored in storage device 20 to smart card 80.

Terminal 11 performs transmission of the electronic ticket to the smart card, step 330, and acknowledges the end of the transaction by returning an acknowledgement to node computer 41, step 332. The reception of said acknowledgement in node computer 41 can be followed for example by the output of a voucher, e.g. by a printer connected to terminal 11.

Figure 7:
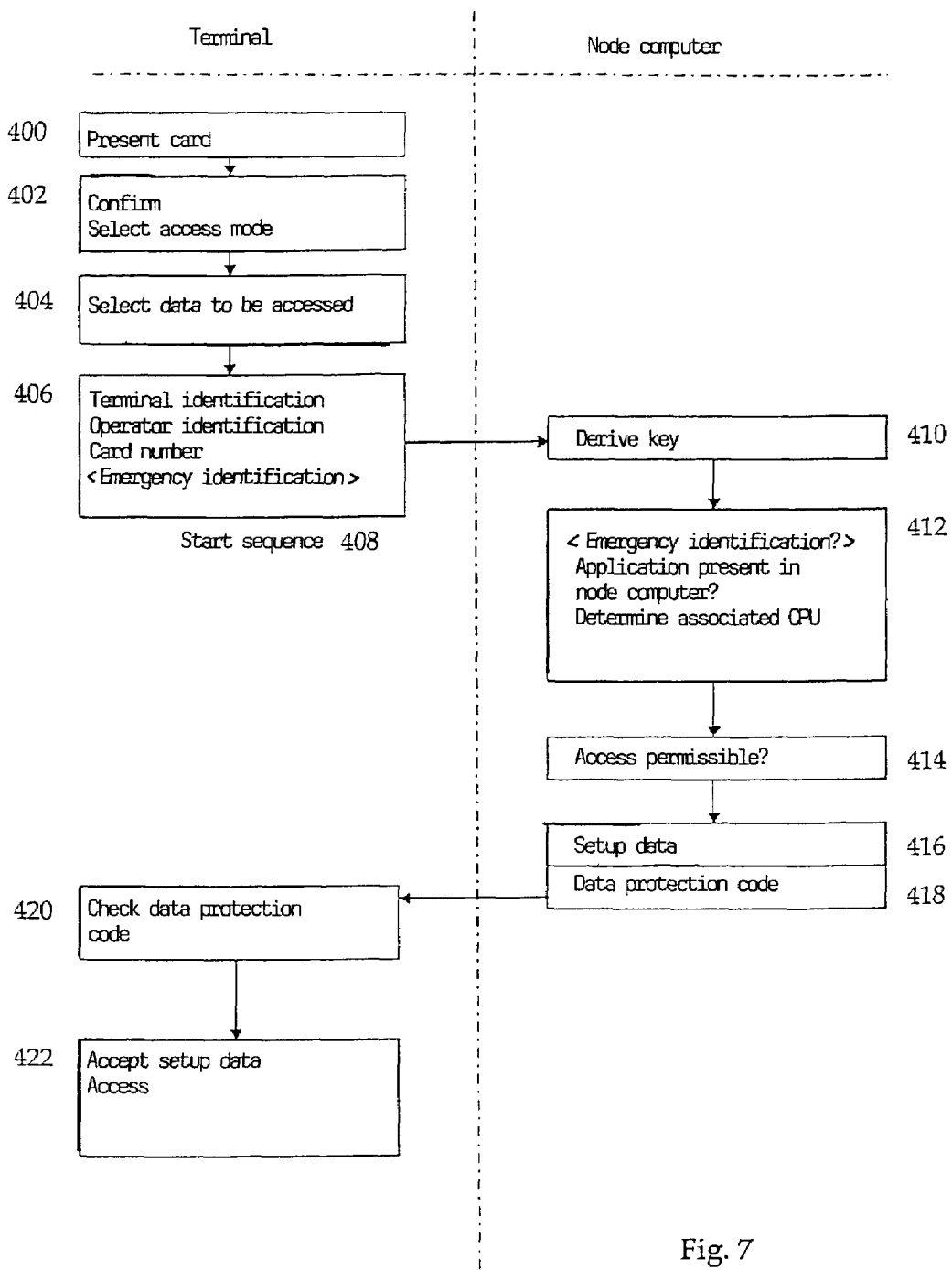
FIG. 7 shows a data exchange using a terminal for handling health insurance cards.

FIG. 7 illustrates as a further possible use of the transaction system shown in FIG. 2 a variant in which a terminal is used in a health insurance card system. It is assumed that the health insurance card again has the form of smart card 80 and the functionality for handling health insurance cards is already present in storage device 20 of terminal 11. Terminal 11 is located for example in a doctor's office, hospital or institution for billing medical services, e.g. a health insurance company. Medical staff are granted different access rights to health insurance card 80 compared to the health insurance company members.

A transaction using health insurance card 80, simply designated card in the following, is started by card 80 being presented to user data interface 15 of terminal 11, step 400. Terminal 11 then confirms via picture display unit 14 that a transaction was requested using a health insurance card and—in normal operation—asks the operator to state whether he wants to access card 80 in read-only mode or in read-write mode, step 402. Further, it asks the operator, step 404, to state which data stored on card 80 he wants to access. The data kept in the storage device of card 80 are expediently classified according to their objective nature, e.g. accountingwise or medically, this classification being finely subdivided further e.g. in the manner of the medical specialty. The areas of classification are protected against read and write accesses by field-related access keys individually or in groups. The access keys are preferably derived from the card-specific key and information characterizing the operator, e.g. a doctor, or the area of classification, e.g. a medical specialty.

When it is certain which access mode for which area of card 80 the operator desires, terminal 11 asks the operator via picture display unit 14 to identify himself, step 406. This can be done for example by means of operating apparatus 13 by input of a code for identifying a doctor, hospital or health insurance. In addition, terminal 11 determines the card number of card 80.

From the information on desired access mode, card area to be accessed, identification code, number of presented card 80 and from the terminal identification, terminal 11 forms a start sequence, step 408, which it transmits to associated node computer 41. computer 41. Transmission takes place in encrypted form using a transport key which is generated using the terminal identification possibly in a preceding data exchange step and is used to protect the total subsequent data exchange between terminal 11 and node computer 41.

After start sequence 408 arrives in node computer 41 the latter forms a card-specific key with the aid of the card number and a secret allocated to card 80. If the secret is not present in node computer 41 itself, it determines it via background network 50 from managing central processing unit 60, 61.

Node computer 41 thereupon checks whether the information necessary for evaluating start sequence 408 is located in storage device 45. If that is not the case, it determines central processing unit 60 suitable for evaluating the start sequence and starts a data exchange therewith via background network 15, step 412. In the course of the following data exchange, node computer 41 checks, using the operator identification code transmitted with start sequence 408, whether the access to card 80 desired by the operator is permissible. If that is the case, setup data are provided in node computer 41 which enable terminal 11 to perform the desired access to card 80, step 414. The setup data preferably comprise for this purpose one or more access keys each associated with individual areas of card 80.

For the setup data, node computer 41 thereupon forms a data protection code by means of the card-specific key, step 416. The data record consisting of setup data and data protection code is then encrypted with the transport key and sent to terminal 11.

The latter decrypts the received data record with the aid of the transport key, at the same time performing a precheck of the data record for intactness, e.g. by checking the presence of certain data items at defined positions of the data record. If the pre-check is positive, terminal 11 transfers the setup data to card 80. The latter checks the setup data for intactness with the aid of the card-specific key by checking the correctness of the data protection code. If intactness of the setup data is ascertained, card 80 can then be accessed according to the setup data via terminal 11.

Besides the accesses possible in normal operation, an access mode for emergencies is expediently also set up in terminal 11. An emergency transaction is triggered like a transaction in normal operation, but the operator identifies himself in step 406 not by individual personal identification but by an emergency identification.

When node computer 41 or central processing unit 60, 61 recognizes an emergency identification when evaluating start sequence 408 after generation of a key for forming a data protection code and a transport key, it makes a set of access keys available in node computer 41 with reference to the card number so as to permit at least read access to all medical data located on health insurance card 80. To accelerate execution of the transaction it can be provided that an additional check of the operator's authorization is omitted. The node computer provides the access key data record with a data protection code, step 416, encrypts the two with the transport key and transfers the resulting data record to terminal 11.

The latter decrypts the received data record again with the transport key and passes it on to card 80 for a check of intactness by means of the card-specific key. If intactness of the transferred key data record is ascertained, terminal 11 allows read access to all medical data present on card 80.

While retaining the basic concept of determining the functionality of the user-side terminals by preceding node computers in a transaction system, the proposed system, the components used for realizing it and the operating method can be varied within wide limits. This applies e.g. to the physical structure of terminals 10, 11. Their components can be combined if storage device 20, processor 12, cryptobox 17 and operating apparatus 13 form one unit for example. Terminal network 30 can have connected thereto a plurality of node computers 40, 41 which are used for performing different transactions. The possible uses of the system are of course not limited to the described examples. Along with the type of transactions, in particular the distribution of the functionality over terminals and node computers can also be varied. The functionality allocated to the terminal can be limited to passing data through to a data carrier; on the one hand, while extensive data processing directly by a terminal can be set up, on the other hand. Without impairing the basic overall concept, the encryption concept with transport key and data carrier-related key can further be varied within wide limits, whereby encryption can be fully omitted, on the one hand, and additional encryptions provided, on the other hand.

The invention claimed is:

1. A system for performing a transaction presupposing the use of a portable data carrier carrying transaction data which are accessed within the transaction, the system comprising:
   a node computer connected with a plurality of terminals via a terminal network, the node computer having stored therein software for providing a terminal with at least one functionality for performing a requested transaction;
   each of said terminals having a reading apparatus accessing a portable data carrier and being programmed to receive software for further configuring the terminal to perform a requested transaction;
   said terminals being programmed to receive a request for performing a requested transaction and to identify a type of the requested transaction;
   said terminals being programmed to make a determination that the terminal is not configured to perform the requested transaction type;
   said terminals being programmed to request software from said node computer by forming a start sequence, encrypting the start sequence and transmitting the start sequence to the node computer, the start sequence comprising requested transaction information and card data read by said reading apparatus from a portable data carrier;
   said node computer being programmed to receive said start sequence, decrypt said start sequence, and transmit requested software to said terminals;
   said terminals being programmed to receive the requested software via the terminal network;
   wherein the requested software further configures the terminal to perform the requested transaction type, and
   the terminal is configured to perform the requested transaction in interaction between the node computer and the terminal while accessing a portable data carrier, the terminal and the node computer each performing partial steps of the transaction.

2. A system according to claim 1, wherein at least one transaction is performed in interaction between a terminal and said node computer.

3. A system according to claim 1, wherein the terminal is configured to cause transfer of the software for setting up the functionality for performing the transaction.

4. A system according to claim 3, wherein the terminal is configured to cause transmission of the software following the occurrence of a predetermined event in the terminal.

5. A system according to claim 3, wherein the terminal is configured to cause transmission of the software following the triggering of a certain transaction in the terminal.

6. A system according to claim 1, wherein the node computer is connected via a background network with at least one central processing unit configured to be conditionally included in processing a transaction.

7. A system according to claim 6, wherein the node computer is configured to call data from said at least one central processing unit.

8. A system according to claim 1, wherein the node computer has a cipherbox which processes information for encrypting and decrypting data traffic effected with the terminal.

9. The system according to claim 1, wherein said terminal is configured to store said software received from said node computer for future use.

10. A method for performing a transaction including access to transaction specific data stored on a portable data carrier using a terminal connected via a terminal network with a node computer, the transaction to be performed demanding a functionality not available on the terminal, the transaction being triggered by means of the terminal, the method comprising the steps of:

reading transaction specific data from a portable data carrier, identifying a type of transaction to be performed according to said transaction specific data of said portable data card and making a determination whether the terminal is configured to perform the transaction, creating a start sequence designating the transaction to be performed, the start sequence comprising card data read from the portable data carrier and requested transaction information, including in the start sequence an indication based on said determination whether the terminal requires software to perform the transaction, encrypting the start sequence and transmitting the start sequence from the terminal to the node computer, and the node computer receiving and decrypting the start sequence and transmitting software required for performing the transaction in the terminal to the terminal, wherein the node computer is involved in performing the transaction, the transaction being performed in interaction between the terminal and the node computer.

11. A method according to claim 10, wherein when a transaction has been triggered the terminal makes a determination whether software already stored in the terminal permit the transaction to be performed and conditionally performs the transaction based on the determination.

12. The method according to claim 10, further comprising the step of storing said software in said terminal for future use.

* * * * *